United States Patent
Regner et al.

(10) Patent No.: US 11,396,841 B2
(45) Date of Patent: Jul. 26, 2022

(54) AIR HANDLING IN A HEAVY-DUTY OPPOSED-PISTON ENGINE

(71) Applicant: ACHATES POWER, INC., San Diego, CA (US)

(72) Inventors: Gerhard Regner, San Diego, CA (US); Michael Chiang, San Diego, CA (US)

(73) Assignee: Achates Power, Inc., San Diego, CA (US)

( * ) Notice: Subject to any disclaimer, the term of this patent is extended or adjusted under 35 U.S.C. 154(b) by 0 days.

(21) Appl. No.: 16/790,128

(22) Filed: Feb. 13, 2020

(65) Prior Publication Data

US 2020/0182133 A1 Jun. 11, 2020

Related U.S. Application Data

(63) Continuation of application No. 15/775,346, filed as application No. PCT/US2016/064766 on Dec. 2, 2016, now abandoned.

(Continued)

(51) Int. Cl.
*F02B 25/08* (2006.01)
*F02B 37/00* (2006.01)
(Continued)

(52) U.S. Cl.
CPC ............ *F02B 25/08* (2013.01); *F01B 7/02* (2013.01); *F01B 7/14* (2013.01); *F02B 37/004* (2013.01); *F02B 37/013* (2013.01); *F02B 37/04* (2013.01); *F02B 37/16* (2013.01); *F02B 37/162* (2019.05); *F02B 37/18* (2013.01); *F02B 75/282* (2013.01); *F02D 41/0007* (2013.01); *F02M 26/08* (2016.02); *F02M 26/09* (2016.02);
(Continued)

(58) Field of Classification Search
CPC ...... F02B 25/08; F02B 37/162; F02B 37/004; F02B 37/013; F02B 37/04; F02B 37/16; F02B 37/18; F02B 33/34; F02B 39/10; F02B 2075/025; F02B 75/282; F02M 26/08; F02M 26/09; F01B 7/02; F01B 7/14; F02D 41/0007; F02D 2200/04; F02D 2200/101; Y02T 10/12
USPC ........................................................ 60/600
See application file for complete search history.

(56) References Cited

U.S. PATENT DOCUMENTS 4,638,634 A 1/1987 McLean .......................... 60/612
4,669,269 A 6/1987 Dinger et al. .................. 60/612
(Continued)

FOREIGN PATENT DOCUMENTS

CN 108368770 A 8/2018
DE 10 2008 017280 11/2009
(Continued)

OTHER PUBLICATIONS

International Search Report and Written Opinion for PCT application No. PCT/US2016/064766, dated Feb. 28, 2017.
(Continued)

*Primary Examiner* — Shafiq Mian
(74) *Attorney, Agent, or Firm* — Terrance A. Meador

(57) ABSTRACT

An air handling arrangement in a two-stroke cycle, opposed-piston engine with uniflow scavenging and constructed for heavy-duty operation includes sequentially arranged turbochargers in series with a supercharger. In some aspects, the air handling system is equipped with an EGR channel.

20 Claims, 8 Drawing Sheets

Related U.S. Application Data

(60) Provisional application No. 62/279,284, filed on Jan. 15, 2016, provisional application No. 62/264,022, filed on Dec. 7, 2015.

(51) Int. Cl.

| | | |
|---|---|---|
| *F02B 37/013* | (2006.01) | |
| *F02B 37/16* | (2006.01) | |
| *F02B 37/18* | (2006.01) | |
| *F02B 37/04* | (2006.01) | |
| *F02B 33/34* | (2006.01) | |
| *F02B 39/10* | (2006.01) | |
| *F01B 7/02* | (2006.01) | |
| *F01B 7/14* | (2006.01) | |
| *F02M 26/08* | (2016.01) | |
| *F02M 26/09* | (2016.01) | |
| *F02B 75/28* | (2006.01) | |
| *F02D 41/00* | (2006.01) | |
| *F02B 75/02* | (2006.01) | |

(52) U.S. Cl.
CPC .............. *F02B 33/34* (2013.01); *F02B 39/10* (2013.01); *F02B 2075/025* (2013.01); *F02D 2200/04* (2013.01); *F02D 2200/101* (2013.01); *Y02T 10/12* (2013.01)

(56) References Cited

U.S. PATENT DOCUMENTS

| | | | |
|---|---|---|---|
| 4,730,457 A | 3/1988 | Yamada et al. ................. 60/609 |
| 5,488,827 A | 2/1996 | Helmich et al. ................ 60/612 |
| 6,523,341 B1 | 2/2003 | Rumpsa et al. ................ 60/277 |
| 7,540,150 B2 | 6/2009 | Schmid et al. ................. 60/612 |
| 8,281,587 B2 | 10/2012 | Xin et al. ........................ 60/611 |
| 8,429,912 B2 | 4/2013 | Guggenberger et al. ....... 60/611 |
| 8,459,025 B2 | 6/2013 | Schwarte ........................ 60/612 |
| 8,549,854 B2 | 10/2013 | Dion et al. .................. 60/605.2 |
| 9,200,578 B2* | 12/2015 | Flohr ................... F02B 37/013 |
| 9,206,751 B2 | 12/2015 | Herold et al. ...... F02D 41/0007 |
| 9,410,506 B2 | 8/2016 | Dion et al. ......... F02M 25/0747 |
| 9,926,867 B1* | 3/2018 | Schum ............... F02D 41/0007 |
| 9,951,725 B2 | 4/2018 | Dion et al. ............ F02M 26/41 |
| 2007/0169479 A1 | 7/2007 | Nicolle et al. ................. 60/612 |
| 2009/0038309 A1* | 2/2009 | Cocca ..................... F02B 37/18 60/603 |
| 2009/0255517 A1 | 10/2009 | Ishikawa et al. ............ 60/605.2 |
| 2011/0094486 A1* | 4/2011 | Vuk .......................... F01N 5/04 123/568.21 |
| 2011/0253112 A1 | 10/2011 | Guggenberger .............. 123/562 |
| 2012/0144825 A1 | 6/2012 | Stegmaier et al. ............. 60/609 |
| 2013/0008161 A1 | 1/2013 | Flohr .............................. 60/600 |
| 2013/0055711 A1* | 3/2013 | Hofer .................... F02B 37/013 60/605.1 |
| 2013/0199179 A1* | 8/2013 | Kitsukawa .............. F02D 21/08 60/605.2 |
| 2014/0026563 A1 | 1/2014 | Dion et al. ......... F02M 25/0747 |
| 2014/0230430 A1 | 8/2014 | Krug et al. ..................... 60/600 |
| 2014/0358404 A1 | 12/2014 | Lavertu et al. ............... 701/105 |
| 2015/0083096 A1 | 3/2015 | Zagone et al. ........... 123/568.11 |
| 2015/0128907 A1 | 5/2015 | Redon ..................... F02B 75/12 |
| 2015/0219030 A1 | 8/2015 | Naik ................... F02D 41/0055 |
| 2016/0160781 A1 | 6/2016 | Nagar et al. .......... F02D 41/221 |
| 2016/0326972 A1* | 11/2016 | Kim ................. F02M 35/10157 |
| 2017/0184038 A1 | 6/2017 | Garrard et al. .................. 477/32 |
| 2017/0204801 A1* | 7/2017 | Sharma .................. F02B 75/282 |
| 2017/0234209 A1 | 8/2017 | Kondo et al. ................... 60/607 |
| 2018/0347499 A1 | 12/2018 | Wang et al. ..................... 41/263 |
| 2019/0003373 A1 | 1/2019 | Reaper et al. .......... F02B 25/08 |

FOREIGN PATENT DOCUMENTS

| | | |
|---|---|---|
| EP | 1008735 A2 | 6/2000 |
| EP | 3359790 B1 | 6/2020 |
| WO | WO-2011/146111 A1 | 11/2011 |
| WO | WO-2015/004497 A1 | 1/2015 |
| WO | WO-2015/123262 A1 | 8/2015 |
| WO | WO-2017/100097 A1 | 6/2017 |

OTHER PUBLICATIONS

Communication pursuant to Article 94(3) EPC, dated Apr. 9, 2019, for European Patent Application No. 16813203.3.
Non-Final Office Action for U.S. Appl. No. 15/775,346, dated Nov. 13, 2019.
Opposed Piston Engines, Evolution, Use, and Future Applications, by J-P. Pirault and M. Flint, SAE International, Warrendale Pa., 2010, p. 144.
Applicant Response to EPO 94(3) Communication in EP Application 16813203.3, submitted Oct. 16, 2019.
English Translation of Claims and First Office Action in CN Patent Application 2016800705419, dated Apr. 9, 2020.

* cited by examiner

AIR HANDLING IN A HEAVY-DUTY OPPOSED-PISTON ENGINE

PRIORITY

This application is a continuation of U.S. application Ser. No. 15/775,346, filed on May 10, 2018, which is a U.S. national phase application filed under 35 U.S.C. 371 of International application no. PCT/US2016/064766, filed on Dec. 2, 2016, which claims priority to U.S. Provisional Application No. 62/264,022 filed on Dec. 7, 2015, and to U.S. Provisional Application No. 62/279,284 filed on Jan. 15, 2016.

RELATED APPLICATIONS

This application contains subject, matter related to that of commonly-owned U.S. patent application Ser. No. 14/039,856, filed Sep. 27, 2013, and published as US 2014/0026563, now U.S. Pat. No. 9,410,506, and commonly-owned PCT application no. PCT/US2015/015365, filed Feb. 11, 2015, published as WO 2015/123262, which claims priority to U.S. 61/939,170 filed Feb. 12, 2014.

FIELD OF THE INVENTION

The field is two-stroke cycle, uniflow-scavenged, opposed-piston engines. More specifically the application relates to air handling for opposed-piston engines by means of a multi-stage arrangement of turbochargers provided in series with a supercharger to provide a variable flow of charge air with minimal pumping loss.

BACKGROUND

A two-stroke cycle engine is an internal combustion engine that completes a cycle of operation with a single complete rotation of a crankshaft and two strokes of a piston connected to the crankshaft. The strokes are typically denoted as compression and power strokes. One example of a two-stroke cycle engine is an opposed-piston engine in which two pistons are disposed head-to-head in the bore of a cylinder for reciprocating movement in opposing directions. The cylinder has longitudinally-spaced inlet and exhaust ports formed in the cylinder sidewall near respective ends of the cylinder. Each of the opposed pistons controls a respective one of the ports, opening the port as it moves toward a bottom dead center (BDC) location during a power stroke (also called an expansion stroke), and closing the port as it moves from BDC toward a top dead center (TDC) location during a compression stroke. One of the ports provides passage for the products of combustion out of the bore, the other serves to admit charge air into the bore; these are respectively termed the "exhaust" and "intake" ports. In a uniflow-scavenged opposed-piston engine, charge air entering a cylinder through the intake port displaces exhaust gas flowing out of the exhaust port, thus gas flows through the cylinder in one direction ("uniflow")—from intake port to exhaust port.

Gas, including charge air, exhaust products, and mixtures thereof, is transported through the engine's cylinders via an air handling system. The air handling system may be equipped for exhaust gas recirculation ("EGR") to reduce undesirable compounds produced by combustion. As the engine cycles, the air handling control mechanization governs gas flow by operating the air handling system in response to engine operating conditions and operator commands.

In a two-stroke, uniflow-scavenged, opposed-piston engine a continuous positive pressure differential must exist from the intake ports to the exhaust ports in order to maintain the desired unidirectional flow of gas in the cylinder. Further, a high air mass density must be provided to the intake ports because of the short time that they are open; this need is especially acute during engine start and acceleration. Typically, these needs are met by provision of a fast acting, positive-displacement pump in the charge air channel, just upstream from the engine's intake ports. This role is typically filled by a supercharger (or blower) which is driven mechanically from an engine crankshaft, either by direct connection, as with a belt, chain, or gear, or by way of a single-speed, multiple-speed, or continuously variable drive. Frequently, a turbocharger, powered by exhaust energy, is placed ahead (upstream) of the supercharger in order to increase the density of intake air fed into the supercharger.

Two-stroke cycle, opposed-piston engines provide superior power densities and brake thermal efficiencies as compared to their four-stroke counterparts. To date these engines have been used successfully in stationary applications and in aircraft, maritime vessels, locomotives, and tracked military vehicles.

It is desirable to achieve similar benefits by use of opposed-piston engines in modern heavy duty vehicles. Heavy duty vehicles may be defined in the US as vehicles of GVWR (gross vehicle weight rating) of above 8,500 pounds, according to Federal regulations, and above 14,000 pounds in California. Similar definitions and classifications are used in other countries to define heavy duty vehicles. Trucks and busses are examples of heavy duty vehicles. In this disclosure, opposed-piston engines designed and/or built to power heavy-duty vehicles are referred as "heavy duty" opposed-piston engines. A heavy-duty opposed-piston engine must be able to deliver sufficient power under specified efficiency and emission standards in the normal conditions encountered during operation of a heavy duty vehicle.

The Commer TS3 engine represents one successful application of an opposed-piston engine design to a medium-duty commercial truck. The air handling configuration of the TS3 engine was not turbocharged; however, it was supercharged, with a three-lobe, crankshaft-driven, Rootes-type blower feeding air at high speed to the engine. Depending on the model, displacement of the TS3 engine varied from 3.26 to 3.52 liters, and power output varied from 78.3 to 107.4 KW. According to Pirault and Flint, the TS3 was powerful, delivering "probably 50% greater torque than from equivalent displacement, naturally-aspirated four-stroke diesel truck engines of that period." (*OPPOSED PISTON ENGINES, Evolution, Use, and Future Applications*, by J-P. Pirault and M. Flint, SAE International, Warrendale Pa., 2010, p. 144).

Two-stroke cycle engines with large displacements and high power ratings must be equipped with air handling systems capable of pumping large amounts of densified air. It is desirable that the air handling system of a heavy duty opposed-piston engine be able to maintain a desirable scavenge ratio ($M_{trapped}/M_{delivered}$) and high brake thermal efficiency when the engine experiences a steep increase in torque demand, as when accelerating from low engine speed while heavily loaded, or encountering a steep hill. A supercharger is typically used to move charge air to engine intake ports quickly enough to maintain the scavenge ratio, but running it hard for a long period increases pumping loss, which reduces the engine's brake thermal efficiency.

In order to meet boost requirements of a heavy-duty two-stroke cycle, uniflow-scavenged, opposed-piston engine, without excessive pumping loss, it is desirable to reduce reliance on a supercharger in the air handling system by way of a sequential turbocharger in series with the supercharger.

SUMMARY

The invention is directed to an air handling system of a two-stroke cycle, uniflow-scavenged, opposed-piston engine, which includes a supercharger in fluid communication with one or more intake ports of the engine and a sequential turbocharger in series with the supercharger. The sequential turbocharger includes a first stage for low pressure operation, a second stage for high pressure operation, and at least one valve-controlled bypass circuit to engage or disengage the second stage. In some instances, a second valve-controlled bypass circuit may be provided to engage or disengage the first stage. The sequential turbocharger provides compressed charge air to the supercharger as needed during engine operation. In normal and transient engine operating conditions, the second stage may be bypassed while the first stage operates. When high pressure ratios are needed, the second stage is engaged, thereby adding a further stage of charge air compression, which increases the pressure of the charge air input to the supercharger, and thereby the mass of charge air delivered ($M_{delivered}$) to the intake ports.

In some aspects, the air handling system may be equipped with an EGR loop. In some further aspects, the EGR loop may include one of a low pressure EGR loop upstream of the sequential turbocharger, a mid-pressure EGR loop between the first and second turbocharger stages, and a high pressure EGR loop between the second stage and the supercharger. Further, the air handling system may be equipped with one or more of the low pressure EGR loop, the mid-pressure EGR loop, and the high pressure EGR loop.

BRIEF DESCRIPTION OF THE DRAWINGS

The below-described drawings are meant to illustrate principles and examples of the invention. They are not meant to be limiting; and they are not necessarily to scale.

DETAILED DESCRIPTION

In this disclosure, "fuel" is any fuel that can be used in an opposed-piston engine. The fuel may be a relatively homogeneous composition, or a blend. For example, the fuel may comprise diesel fuel, natural gas, gasoline, or another equivalent fuel ignitable by compression, pilot, and/or spark ignition. Further, the descriptions contemplate ignition resulting from compression of an air/fuel mixture; however in some instances it may be desirable to provide additional mechanisms, such as glow plugs, spark plugs, pilot injections, or laser circuits to assist compression ignition.

According to this disclosure, fuel is injected into compressed air in a combustion chamber formed between the end surfaces of opposed pistons when the pistons are at or near TDC locations. In other aspects, injection may occur earlier in the compression stroke, soon after closure of both ports. The air is preferably pressurized ambient air; however, it may include other components such as exhaust gases or other diluents. In any such case, the pressurized air delivered to an intake port is referred to as "charge air."

According to this disclosure, the opposed-piston engine is provided with an engine control mechanization—a computer-based system that includes one or more electronic control units coupled to associated sensors, actuators, and other machine devices throughout the engine that govern the operations of various engine systems, including the air handling system, a fuel system, a cooling system, a lubrication system, and other engine systems. The engine control elements that govern the air handling system are referred to collectively as the "air handling control mechanization".

Figure 1:
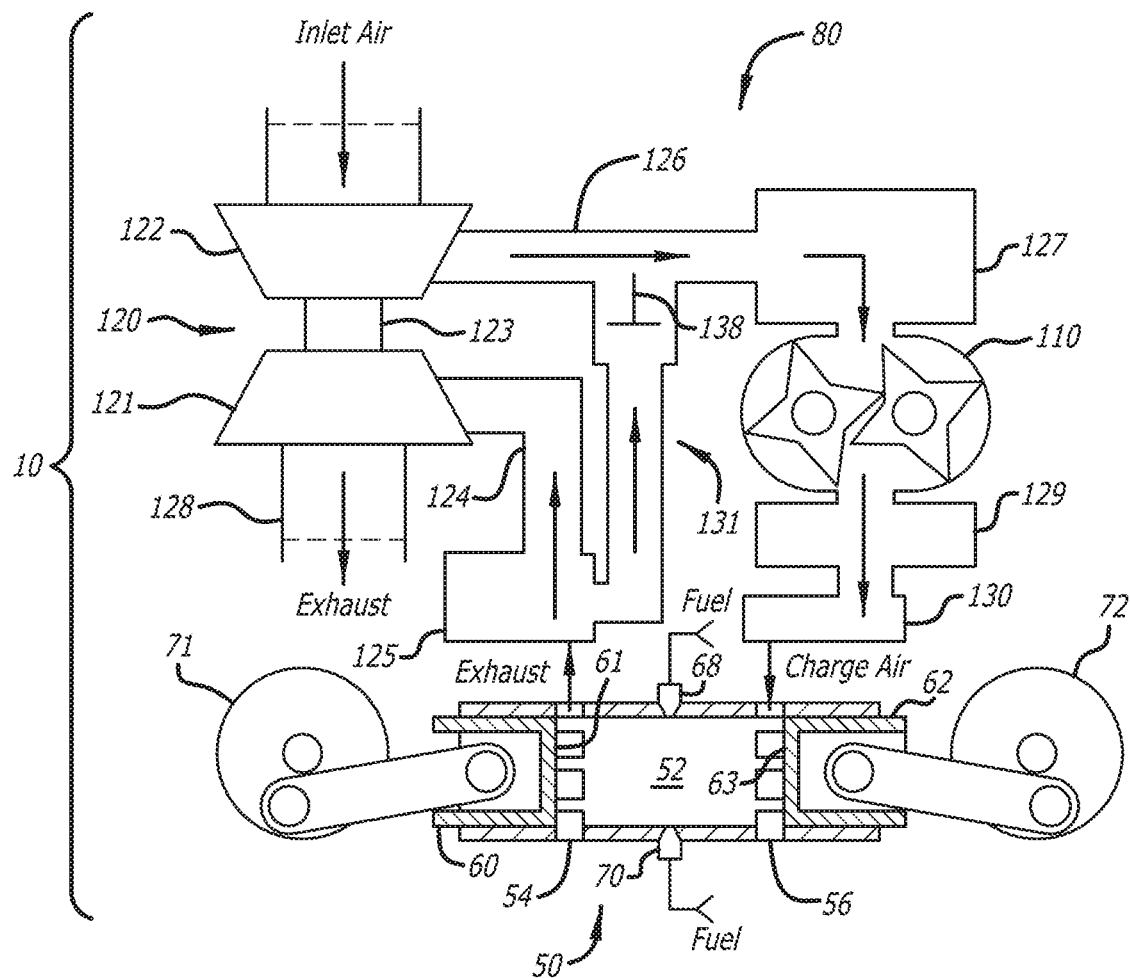
FIG. 1 is a schematic diagram of a prior art two-stroke cycle, opposed-piston engine with uniflow scavenging, and is appropriately labeled "Prior Art".
Figure 2:
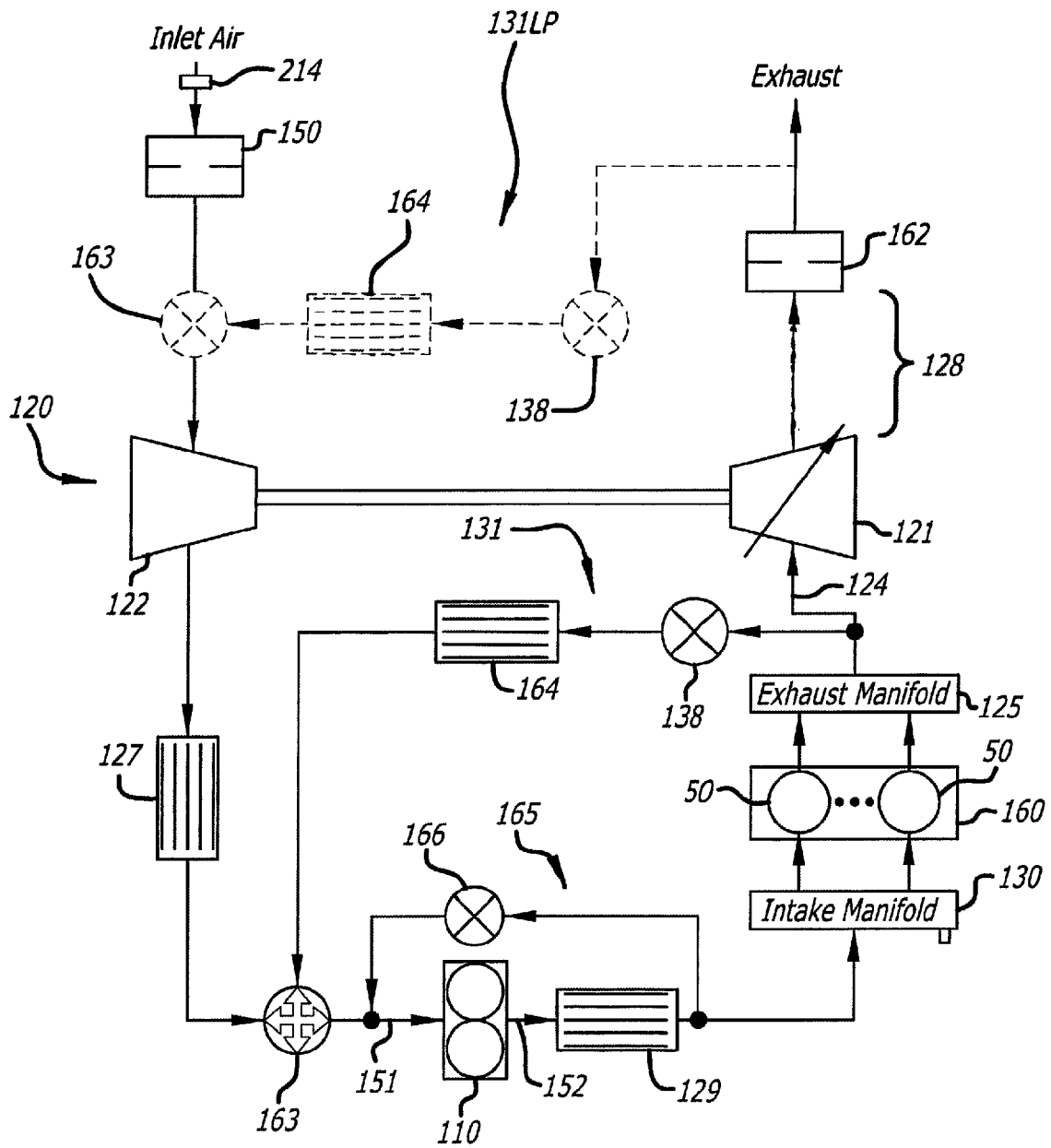
FIG. 2 is a schematic diagram showing details of a prior art air handling system for an opposed-piston engine, and is appropriately labeled "Prior Art".

Opposed-Piston Engine and Operation:

FIGS. 1 and 2 illustrate a prior art turbocharged, two-stroke cycle, opposed-piston engine 10 with uniflow scavenging. The engine 10 has at least one ported cylinder 50. For example, the engine may have one ported cylinder, two ported cylinders, three ported cylinders, or four or more ported cylinders. Each ported cylinder 50 has a bore 52 and longitudinally-spaced exhaust and intake ports 54 and 56 formed or machined near respective ends of a cylinder sidewall. Each of the exhaust and intake ports 54 and 56 includes one or more circumferential arrays of openings in which adjacent openings are separated by a solid portion of the cylinder sidewall called a "bridge". In some descriptions, each opening is referred to as a "port"; however, the construction of circumferential arrays of such "ports" is no different than the port constructions shown in FIG. 1. Pistons 60 and 62 are slidably disposed in the bore 52 with their end surfaces 61 and 63 opposing one another. The piston 60 controls the exhaust port 54, and the piston 62 controls the intake port 56. In the example shown, the engine 10 further includes at least one crankshaft; preferably, the engine includes two crankshafts 71 and 72. In the example shown, the exhaust pistons 60 of the engine are coupled to the crankshaft 71, and the intake pistons 62 to the crankshaft 72.

As the pistons 60 and 62 near TDC, a combustion chamber is defined in the bore 52 between the end surfaces 61 and 63 of the pistons. Combustion timing is frequently referenced to a point in a compression cycle where minimum combustion chamber volume occurs; this point is referred to as "minimum volume." Fuel is injected directly into cylinder space located between the end surfaces 61 and 63. In some instances injection occurs at or near minimum volume; in other instances, injection may occur before minimum volume. Fuel is injected through fuel injector nozzles 68 and 70 positioned in respective openings through the sidewall of the cylinder 50. Preferably, the fuel injector nozzles 68 and 70 are positioned to inject respective sprays of fuel in opposing radial directions of the bore 52. The fuel mixes with charge air admitted into the bore 52 through the intake port 56. As the air-fuel mixture is compressed between the end surfaces 61 and 63, the compressed air reaches a temperature that causes the fuel to ignite: combustion follows.

The engine 10 includes an air handling system 80 that manages the transport of charge air provided to, and exhaust gases produced by, the engine 10. A representative air handling system construction includes a charge air channel and an exhaust channel. In the air handling system 80, a charge air source receives inlet air and processes it into charge air. The charge air channel receives the charge air and transports it to the at least one intake port of the engine. The exhaust channel transports exhaust products from the at least one exhaust port of the engine for delivery to other exhaust components.

The air handling system 80 includes a turbocharger 120 with a turbine 121 and a compressor 122 that rotate on a common shaft 123. The turbine 121 is in fluid communication with the exhaust subsystem and the compressor 122 is in fluid communication with the charge air subsystem. The turbocharger 120 extracts energy from exhaust gas that exits the exhaust ports 54 and flows into an exhaust channel 124 from an exhaust manifold, plenum, or chest 125 (collectively, "exhaust manifold", for convenience) that collects exhaust gases output through the exhaust ports 54. In this regard, the turbine 121 is rotated by exhaust gas passing through it to an exhaust outlet channel 128. This rotates the compressor 122, causing it to generate charge air by compressing fresh air. The charge air channel 126 includes the compressor, a supercharger 110, and an intake manifold, plenum, or chest 130 (collectively, "intake manifold", for convenience). The charge air channel may further include at least one charge air cooler (hereinafter, "cooler") to receive and cool the charge air before delivery to the intake port or ports of the engine. The charge air output by the compressor 122 flows through the charge air channel 126 to a cooler 127, whence it is pumped by the supercharger 110 to the intake ports. Charge air compressed by the supercharger 110 is output to the intake manifold 130. The intake ports 56 receive charge air pumped by the supercharger 110, through the intake manifold 130. A second cooler 129 may be provided between the output of the supercharger 110 and the input to the intake manifold 130.

In some aspects, the air handling system 80 may be equipped to reduce NOx emissions produced by combustion by recirculating a portion of the exhaust gas produced by combustion through the ported cylinders of the engine. The recirculated exhaust gas is mixed with charge air to lower peak combustion temperatures, which reduces production of NOx. This process is referred to as exhaust gas recirculation ("EGR"). The EGR construction shown obtains a portion of the exhaust gases flowing from the port 54 during scavenging and transports them via an EGR channel 131 external to the cylinder into the incoming stream of inlet air in the charge air subsystem. The recirculated exhaust gas flows through the EGR channel 131 under the control of a valve 138 (this valve may also be referred to as the "EGR valve").

FIG. 2 shows the air handling system 80 in greater detail. In this regard, the charge air subsystem provides air to the compressor 122 via an air filter 150. As the compressor 122 rotates, compressed air flows from the compressor's outlet, through the charge air channel 126, and into the inlet 151 of the supercharger 110. Charge air pumped by the supercharger 110 flows through the supercharger's outlet 152 into the intake manifold 130. Pressurized charge air is delivered from the intake manifold 130 to the intake ports of the cylinders 50, which are supported in an engine block 160. A second cooler 129 may be provided in the charge air subsystem; in series between the output of the supercharger 110 and the intake manifold 130.

Exhaust gases from the exhaust ports of the cylinders 50 flow from the exhaust manifold 125 into the inlet 124 of the turbine 121 and from the turbine's outlet into the exhaust outlet channel 128. In some instances, one or more after treatment devices 162 are provided in the exhaust channel 128. Exhaust may be recirculated via a high-pressure EGR channel 131 which obtains exhaust from the channel 124 at a point between the exhaust manifold 125 and the input to the turbine 121 and delivers exhaust for mixing with fresh charge air at a point between the output of the compressor 122 and the supercharger input 151. Alternatively (or additionally), exhaust may be recirculated via a low-pressure EGR channel $131_{LP}$ which obtains exhaust at a point between the exhaust outlet and the output of the turbine 121 and delivers exhaust for mixing with fresh charge air upstream of the input to the compressor 122. Presuming that the air handling system includes a high-pressure EGR channel, a portion of the exhaust flowing out of the manifold 125 is recirculated through the EGR channel 131, under control of the EGR valve 138. The EGR channel 131 is coupled to the charge air subsystem via the EGR mixer 163. In some instances, although not necessarily, an EGR cooler 164 is provided in the EGR channel 131 in series between the EGR valve 138 and the EGR mixer 163. In other instances, there may be no cooler in the EGR channel 131. As per FIG. 2, a low-pressure EGR channel may be similarly constructed.

The air handling system 80 is equipped for control of gas flow at separate control points in the charge air and exhaust subsystems. In the charge air channel, charge air flow and boost pressure are controlled by operation of a recirculation channel 165 coupling the outlet 152 of the supercharger to the supercharger's inlet 151. In some instances, the channel 165 may be referred to as a "bypass channel" or a "shunt channel." The recirculation channel 165 shunts charge air flow from the outlet 152 to the inlet 151 of the supercharger according to the setting of a recirculation valve 166. The recirculation channel enables control of the flow of charge air into, and thus the pressure in, the intake manifold 130. Other valves may be provided at other control points in the air handling system. Such other valves may include, without limitation, back pressure and wastegate valves associated with the turbine, bypass valves associated with coolers, and possibly, other valves.

In some instances, additional control of gas flow (and pressure) is provided by way of a variable-speed supercharger and/or a variable-geometry turbine. Thus, in some aspects the supercharger 110 may be coupled by a drive mechanism ("drive") to one of the crankshafts or another rotating element of the engine, to be driven thereby. The drive may comprise a single-speed transmission, a stepwise transmission, or a continuously variable transmission (CVT), device, with a clutch, in which cases, charge air flow, and boost pressure, may be varied by varying the speed of the supercharger. In other instances, the supercharger may be a single-speed device with or without a clutch. In those aspects where the turbine is a variable-geometry device it has an effective opening size that may be varied in response to changing speeds and loads of the engine.

Air Handling in a Heavy-Duty, Opposed-Piston Engine:

The invention is directed principally to aspects of an air handling system in an opposed-piston engine with the understanding that these aspects may be combined with other systems and functions such as fuel injection, cooling, lubrication, on-board diagnostics, and so on, in the opposed-piston engine.

An air handling system of a heavy-duty, two-stroke cycle, uniflow-scavenged, opposed-piston engine in which a supercharger provides boost and drives uniflow scavenging during engine operation is illustrated by embodiments shown in FIGS. 3-7, in which an air handling system according to FIG. 2 is modified according to this disclosure.

In these embodiments, a two-stroke cycle, uniflow-scavenged opposed piston engine includes at least one cylinder with a bore, longitudinally-separated exhaust and intake ports, and a pair of pistons disposed in the bore for opposing movements therein, in which movement of a first piston of the pair of pistons controls the exhaust port and movement of the second piston of the pair of pistons controls the intake port. The supercharger is disposed in fluid communication with the intake ports of the engine to provide a continuous positive pressure differential from the intake port to the exhaust port so as to maintain a unidirectional flow of gas from the intake to the exhaust port during two-stroke operation of the engine. A multi-stage turbocharger arrangement (which is sometimes called a "sequential turbocharger") comprises at least two turbochargers disposed in series. Each turbocharger includes a turbine and a compressor that turn on a common shaft. The compressors of the turbochargers are arranged in series with the supercharger such that the compressor outlet of a first turbocharger is in fluid communication with the compressor inlet of a second turbocharger and the compressor outlet of the second turbocharger is in fluid communication with the inlet of the supercharger. The turbines of the first and second turbochargers are arranged in series with the exhaust ports of the engine such that the turbine inlet of the second turbocharger is in fluid communication with the exhaust ports and the turbine inlet of the first turbocharger is in fluid communication with the turbine outlet of the second turbocharger.

In each embodiment, the air handling system is configured with a mass air flow path (called a "charge air channel") comprising a supercharger having an outlet coupled to one or more cylinder intake ports and one or more turbocharger compressors to provide compressed air to an intake of the supercharger. Some of the embodiments further comprise an EGR loop.

First Air Handling Embodiment

Figure 3:
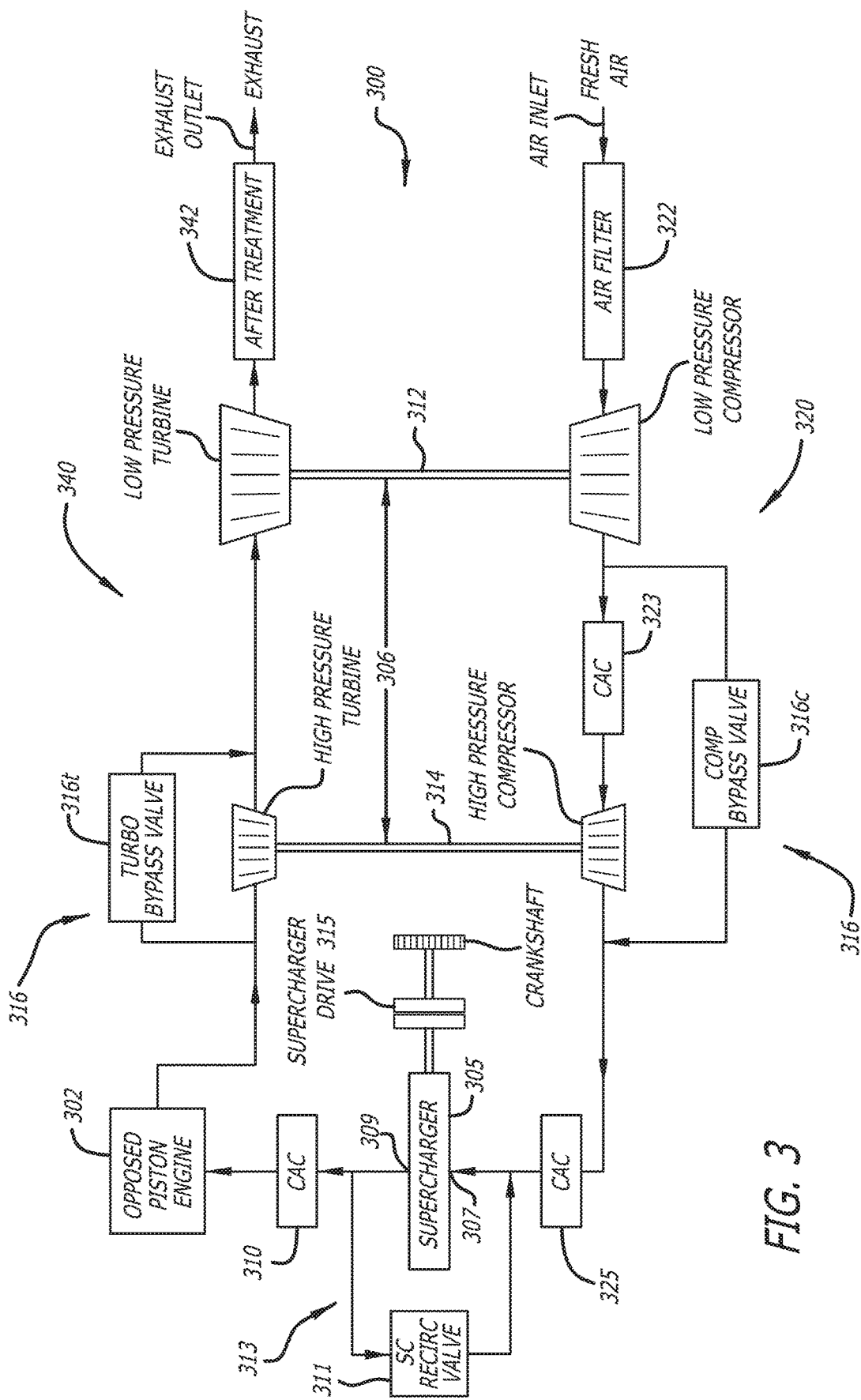
FIG. 3 is a schematic diagram showing details of an air handling system for a two-stroke cycle, opposed-piston engine according to a first embodiment.

A first air handling embodiment according to the invention is shown in FIG. 3. The embodiment includes a two-stroke cycle, uniflow-scavenged, opposed-piston engine 302. The engine 302 includes one or more cylinders as per the cylinder 50 in FIGS. 1 and 2. Fuel, coolant, and lubrication are provided to the engine although the systems for doing so are not shown. The engine 302 is equipped with an air handling system 300. The air handling system 300 transports fresh air into, and exhaust out of, the engine 302. The air handling system 300 includes a supercharger 305 in fluid communication with one or more intake ports (not shown) of the engine 302 and a sequential turbocharger 306 in series with the supercharger 305.

The supercharger 305 includes an inlet 307 and an outlet 309. Desirably, the outlet 309 is coupled to a charge air cooler (CAC) 310 through which charge air is fed to an intake manifold (not shown) of the engine 302. The supercharger 305 is a positive displacement device, driven by a crankshaft of the engine 302; in some aspects, the supercharger 305 is operated by a supercharger drive 315 that is coupled directly, or indirectly, to the crankshaft. Preferably, the drive 315 includes, or is associated with, a clutch mechanism that couples the drive 315 to, and decouples the drive 315 from, the crankshaft. When the dive 315 is coupled to the crankshaft, the supercharger 305 operates, accelerating (boosting) a flow of pressurized charge air produced by the sequential turbocharger 306 to the intake ports 56. Otherwise, when the drive 315 is uncoupled, the supercharger 305 ceases being driven by the crankshaft. A supercharger recirculation channel 313 including a supercharger recirculation (SC RECIRC) valve 311 is connected between the inlet 307 and outlet 309 of the supercharger 305. When the supercharger 305 is driven, opening the valve 311 causes recirculation of pressurized charge air from the outlet 309 to the inlet 307 of the supercharger 305, which enables modulation of boost. When the supercharger 305 is not driven, opening the valve 311 enables pressurized charge air to bypass the supercharger 305 and flow to the intake ports 56.

The sequential turbocharger 306 includes a first stage turbocharger 312 for low pressure operation, a second stage turbocharger 314 for high pressure operation, and a valve-controlled bypass circuit 316 to engage or disengage the second stage turbocharger 314. The first stage turbocharger 312 includes a low pressure compressor and a low pressure turbine that turn on a common shaft. The second stage turbocharger 314 includes a high pressure compressor and a high pressure turbine that turn on a common shaft. In some cases, the first and second stage turbochargers are referred to respectively as "large" and "small" turbochargers. The valve-controlled bypass circuit 316 includes a compressor (COMP) bypass valve 316c connected between the inlet and outlet of the high pressure compressor and a turbine (TURBO) bypass valve 316t connected between the inlet and outlet of the high pressure turbine.

The first air handling embodiment includes a charge air channel 320 comprising the low pressure compressor, the high pressure compressor, and the supercharger 305. Unpressurized fresh air enters the charge air channel via an air inlet, and passes through an air filter 322 to the inlet of the low pressure compressor. The outlet of the low pressure compressor is coupled to the inlet of the high pressure compressor. In some aspects, the charge air channel 320 includes a charge air cooler (CAC) 323 positioned between the outlet of the low pressure compressor and the inlet of the high pressure compressor. In these cases, the compressor bypass valve 316c is connected between the inlet of the CAC 323 and the outlet of the high pressure compressor. In the charge air channel 320, the outlet of the high pressure compressor is coupled to the inlet 307 of the supercharger 305. In some aspects, the charge air channel 320 includes a CAC 325 positioned between the outlet of the high pressure compressor and the inlet 307 of the supercharger 305. Pressurized charge air for combustion in the engine 302 flows from the outlet 309 of the supercharger 305 through an intake manifold (not shown) to the inlet ports of the engine.

The first air handling embodiment includes an exhaust channel 340 comprising the low pressure turbine and the high pressure turbine. The outlet of the high pressure turbine is coupled to the inlet of the low pressure turbine. The outlet of the low pressure turbine is coupled to an exhaust outlet from which exhaust is vented to the atmosphere. In some instances, the exhaust channel may include one or more after treatment devices 342 downstream of the first turbocharger 312, coupled to the outlet of the low pressure turbine. Exhaust gas produced by combustion in the engine 302 flows into the exhaust channel 340 from an exhaust manifold (not shown) to the inlet of the high pressure turbine. Exhaust gas flowing in the exhaust channel 340 drives the low pressure and high pressure turbines.

ADDITIONAL EMBODIMENTS

In some instances the air handling system of FIG. 3 may be equipped with an exhaust gas recirculation (EGR) loop operable to circulate a portion of the exhaust gases produced by the engine to the charge air channel. In this regard, each of second, third, fourth, and fifth air handling embodiments according to the invention includes charge air and exhaust channels as shown in FIG. 3, with an EGR loop. In each case, the EGR loop comprises an inlet connected to the exhaust channel 340, an outlet connected to the charge air channel 320, and an EGR valve between the EGR loop inlet and the EGR loop outlet.

Figure 4:
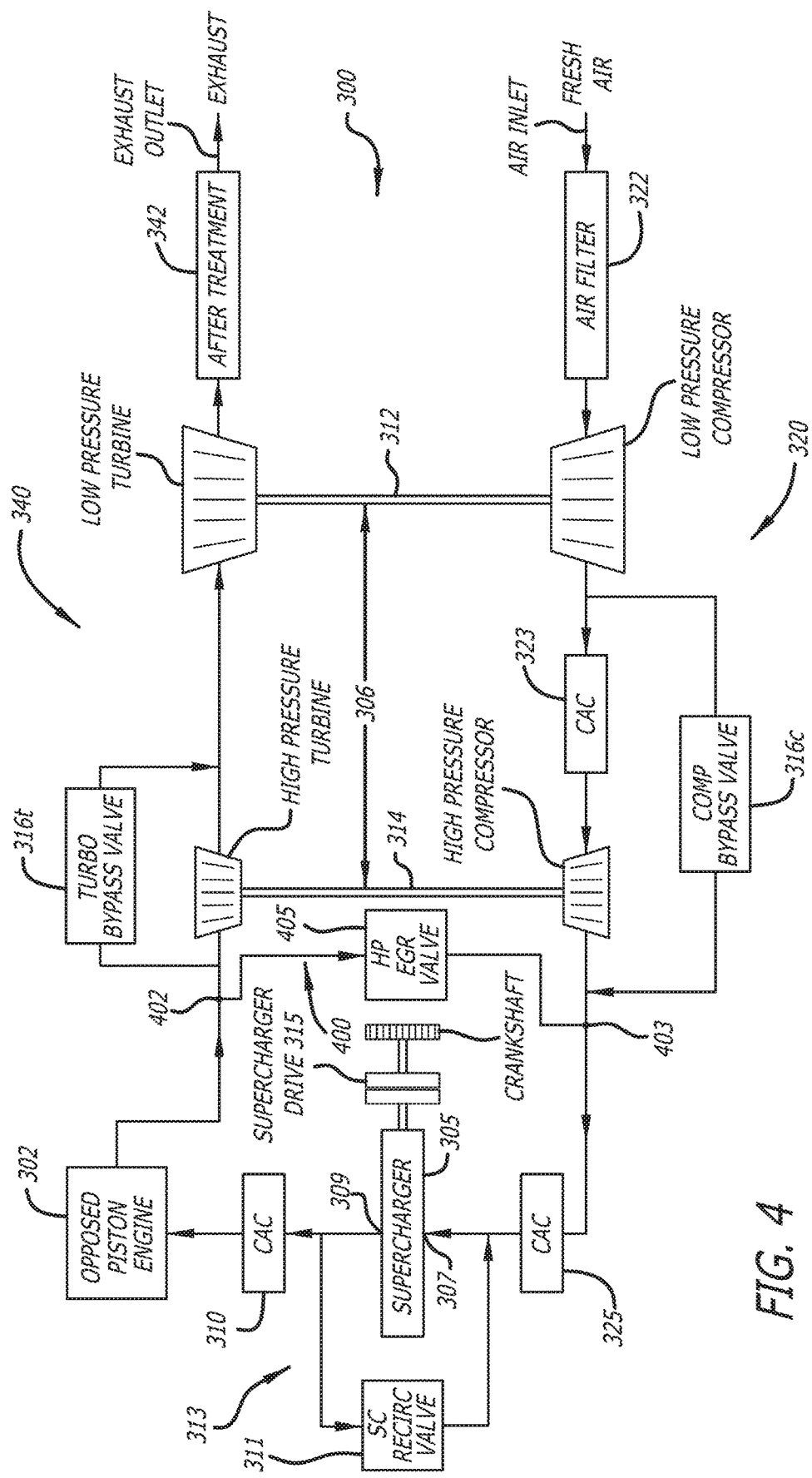
FIG. 4 is a schematic diagram showing details of an air handling system for a two-stroke cycle, opposed-piston engine according to a second embodiment.

In the second embodiment, which is illustrated in FIG. 4, a high pressure EGR loop 400 comprises a loop inlet 402, a loop outlet 403, and an EGR valve 405 between the loop inlet and the loop outlet. The loop inlet 402 is coupled to the exhaust channel 340, upstream of the turbine of the second turbocharger 314, between the manifold outlet of the engine 302 and the turbine bypass valve 316t. The loop outlet 403 is coupled to the charge air channel 320, downstream of the compressor of the second turbocharger 314, between compressor bypass valve 316c and the inlet of the CAC 325.

Figure 5:
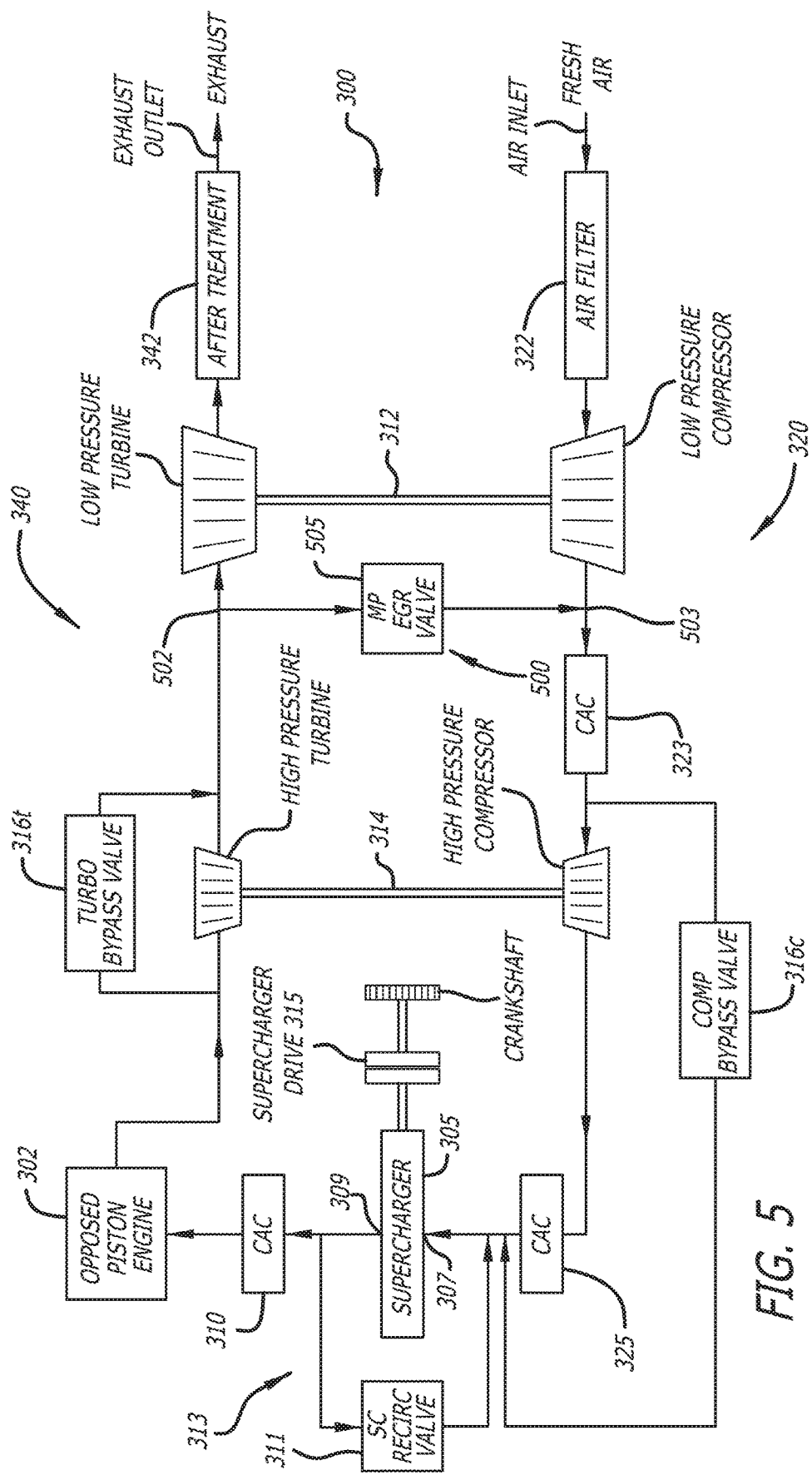
FIG. 5 is a schematic diagram showing details of an air handling system for a two-stroke cycle, opposed-piston engine according to a third embodiment.

In the third embodiment, which is illustrated in FIG. 5, a mid-pressure EGR loop 500 comprises a loop inlet 502, a loop outlet 503, and an EGR valve 505 between the loop inlet and the loop outlet. The loop inlet 502 is coupled to the exhaust channel 340, between the turbine bypass valve 316t and the inlet of the low pressure turbine. The loop outlet 503 is coupled to the charge air channel 320, between the inlet of the CAC 323 and the outlet of the low pressure compressor. In addition, since it is desirable to cool the recirculated exhaust, the CAC 323 can be made continuously available for this purpose, in which case the CAC 325 becomes redundant when the high pressure compressor is bypassed. In this case, the compressor bypass valve 316c is connected between the inlet of the high pressure compressor and the outlet of the CAC 325.

Figure 6:
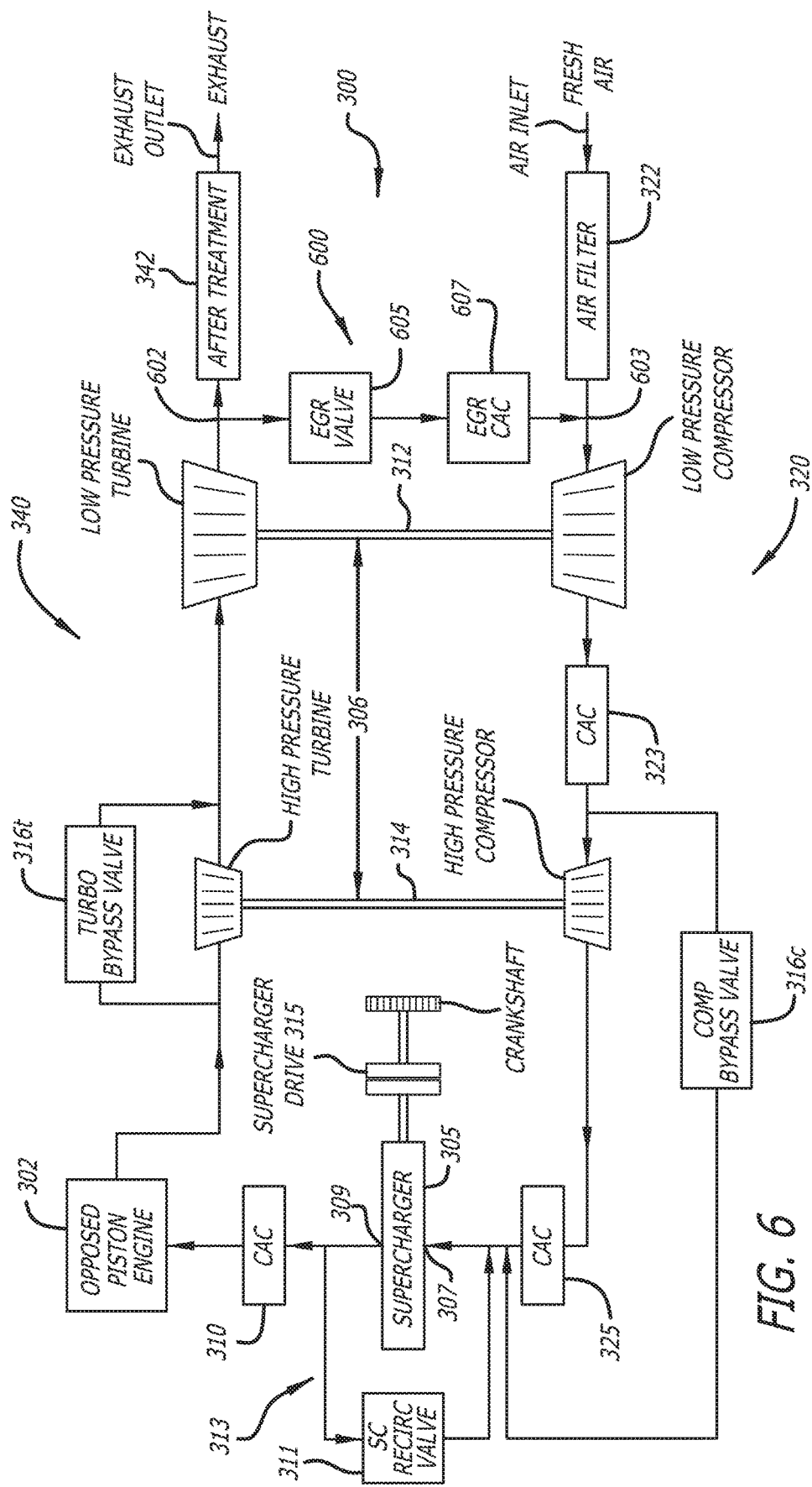
FIG. 6 is a schematic diagram showing details of an air handling system for a two-stroke cycle, opposed-piston engine according to a fourth embodiment.

In the fourth embodiment, which is illustrated in FIG. 6, a low pressure EGR loop 6001 comprises a loop inlet 602, a loop outlet 603, an EGR valve 605 between the inlet and outlet, and an EGR cooler 607 downstream of the EGR valve 605. The loop inlet 602 is coupled to the exhaust channel 340, downstream of the outlet of the low pressure turbine. In those instances in which the exhaust channel 340 comprises after treatment devices 342, the loop inlet 602 is coupled to the exhaust channel 340, between the outlet of the low pressure turbine and the after treatment devices 342. The loop outlet 603 is coupled to the charge air channel 320, upstream of the inlet of the low pressure compressor. In those instances in which the charge air channel 320 comprises an air filter 322, the loop outlet 603 is coupled to the charge air channel 320, between the inlet of the low pressure compressor and the air filter. The EGR valve 605 is disposed in the EGR loop 600, between the loop inlet 602 and the EGR cooler 607. In this embodiment, the compressor bypass valve 316c may be connected so as to bypass the CAC 323 and the high pressure compressor as shown in FIGS. 3 and 4, or the high pressure compressor and the CAC 325 as shown in FIGS. 5 and 6.

Figure 7:
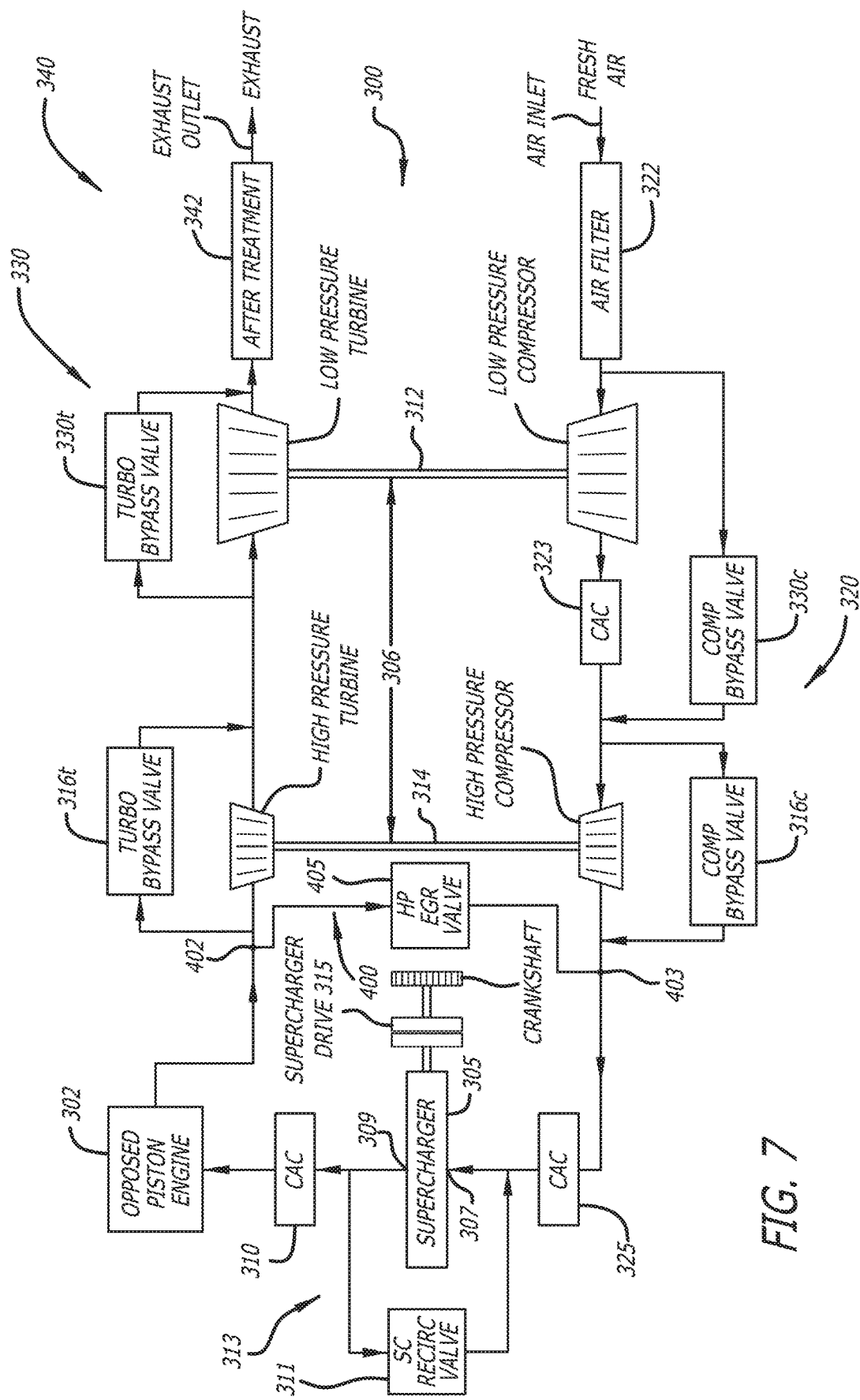
FIG. 7 is a schematic diagram showing details of an air handling system for a two-stroke cycle, opposed-piston engine according to a fifth embodiment.

The fifth embodiment, shown in FIG. 7, is a variant of the second embodiment shown in FIG. 4. In this embodiment, a second valve-controlled bypass circuit 330 is provided to engage or disengage the first stage turbocharger. The second bypass circuit 330 includes a compressor (COMP) bypass valve 330c associated with the first turbocharger 312 and disposed in parallel with the compressor of the first turbocharger. The compressor bypass valve 330c has a closed setting that causes unpressurized fresh air from the air inlet to pass through the compressor of the first turbocharger 312 and an open setting that directs the unpressurized fresh air past the compressor. In a preferred embodiment, the compressor bypass valve 330c is connected between the inlet of the low pressure compressor and the outlet of the charge air cooler 323. In this embodiment, the COMP bypass valve 316c is connected between the inlet and the outlet of the high pressure compressor.

The second bypass circuit 330 further includes a turbine (TURBO) bypass valve 330t associated with the first turbocharger 312 and disposed in parallel with the turbine of the first turbocharger 312. The turbine bypass valve 330t has a closed setting that causes exhaust gasses to pass through the turbine of the second turbocharger 314 and an open setting that directs exhaust gasses past the turbine of the first turbocharger 312. The turbine bypass valve 330t is connected between the inlet and outlet of the low pressure turbine.

The fifth embodiment is particularly useful in the case where recirculated exhaust is transported through the high pressure EGR loop 400 and the high pressure turbine is a variable-geometry (VGT) turbine device; the additional bypass circuit 330 enables the achievement of a desired scavenging ratio at a particular engine operating point while remaining below a peak cylinder pressure limit.

Figure 8:
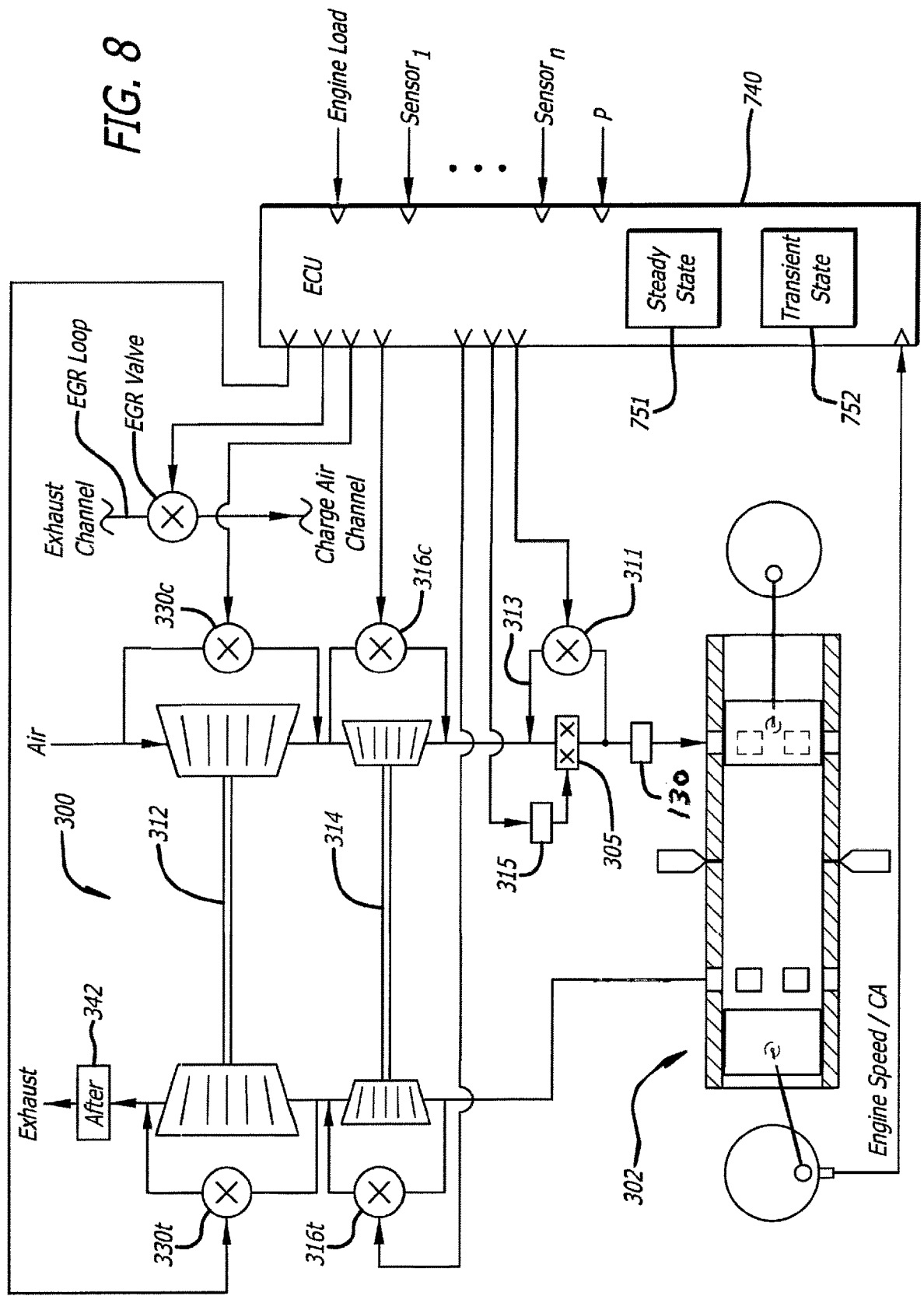
FIG. 8. is a schematic diagram showing details of a control mechanization for an air handling system according the invention

Air Handling Control Mechanization:

As per FIG. 8, control of the gas transport configuration of the air handling system 300 is implemented by a control mechanization that includes a programmed ECU (engine control unit) 740, air handling algorithms executed on the ECU, air handling valves 311, 316c, and 316t, 330c, and 330t, and engine sensors. In some aspects, the air handling control mechanization may further comprise the supercharger drive 315 and, possibly, other drives controlling geometries of the low and high pressure turbines. Air handling system control is exercised by varying the settings of the air handling valves. In this regard, for example, the recirculation valve 311 is associated with the supercharger so as to enable the ECU 740 to control the flow of charge air through the supercharger 305. The supercharger recirculation valve 311 bleeds pressurized charge air produced by the supercharger 305 through a recirculation channel 313 that connects the outlet 309 with the inlet 307 (shown in FIGS. 3-7) so as to modulate charge air pressure, and dampen surges, at the intake ports 56 of the engine 302. The compressor bypass valve 316c and the turbine bypass valve 316t are associated with the second stage turbocharger 314 which enables the ECU 740 to control the mass of charge air provided to the supercharger as needed for boosting in response to sudden increases in demand for engine torque; in the fifth embodiment of FIG. 7, additional control is provided by compressor bypass valve 330c and the turbine bypass valve 330t.

The compressor bypass valve 316c is disposed in parallel with the compressor of the second turbocharger 314 and has a closed setting that causes pressurized air from the compressor of the first turbocharger 312 to pass through the compressor of the second turbocharger 314, and an open setting that directs pressurized air from the compressor of the first turbocharger 312 past the compressor of the second turbocharger 314 to the inlet 307 of the supercharger 305 (either directly as per the third and fourth embodiments, or via the CAC 325 as per the first and second embodiments).

The turbine bypass valve 316t is disposed in parallel with the turbine of the second turbocharger 314 and has a closed setting that causes exhaust gases from the exhaust ports of the engine to pass through the turbine of the second turbocharger 314, and has an open setting that directs exhaust gases from the exhaust ports 54 past the turbine of the second turbocharger 314 to the turbine of the first turbocharger 312.

In the fifth embodiment shown in FIG. 7, the compressor bypass valve 330c is disposed in parallel with the compressor of the first turbocharger 312 and the charge air cooler 323 and has a closed setting that causes fresh air from the ambient environment to pass through the compressor of the first turbocharger 312, and an open setting that directs fresh air from the ambient environment to the compressor inlet of the second turbocharger 314. The turbine bypass valve 330t is disposed in parallel with the turbine of the first turbocharger 312 and has a closed setting that causes exhaust gases to pass through the turbine of the first turbocharger 312, and has an open setting that directs exhaust gases past the turbine of the second turbocharger 314 to the after treatment devices 342.

For fast, precise automatic operation, it is preferred that these and other air handling valves be high-speed, computer-controlled devices, with step-wise or continuously-variable settings. The ECU 740 is in control communication with actuators (not seen) that operate the air handling valves in response to ECU-issued control signals.

The ECU 740 monitors air handling system operating conditions by way of various sensors. In this regard, for example, supercharger intake and outlet charge air pressures may be measured with gas pressure sensors. Air mass flow into the charge air subsystem may be measured by a mass airflow (MAF) sensor upstream of the low pressure compressor; exhaust mass flow in the EGR channel may be measured by a sensor downstream of the EGR valve; and gas temperature at the supercharger inlet may be measured by a gas temperature sensor. In particular, the ECU 740 detects charge air pressure at the intake manifold 130 by way of a gas pressure sensor P. In addition, the ECU 740 detects engine speed and crankshaft angle (CA) by means of a speed sensor 749 that engages one of the crankshafts of the engine. Using a number of factors, the ECU 740 calculates engine load. The engine load factors may include, for example fuel flow, accelerator/throttle position, engine speed, environmental conditions, and possibly, other factors. Using programmed control modules, the ECU 740 operates the engine in a steady-state mode with an algorithm implemented in a steady-state module 751, in a transient mode with an algorithm implemented in a transient module 752, and in other modes.

As per FIGS. 3 and 8 the high pressure stage and the low pressure stage of the sequential turbocharger 306 are capable of being operated to vary the mass air pressure delivered to the supercharger 305 by way of the ECU 740 operating the high pressure turbine bypass valve 316t, the low pressure turbine bypass valve 330t, the high pressure compressor bypass valve 316c, and the low pressure compressor bypass valve 330c. With respect to the exhaust channel 340, when the valve 316t is actuated to be fully closed, the exhaust produced by combustion in the engine 302 drives the high pressure turbine; when the valve 316t is actuated to be fully open, the exhaust bypasses the high pressure turbine. In either case, the exhaust flows to and drives the low pressure turbine. However, in the first case the energy of the exhaust is divided between the high and low pressure turbines, while in the second case, the low pressure turbine receives all of the exhaust energy.

With respect to the charge air channel 320, air is received and compressed by the low pressure compressor. Compressed air produced by the low pressure compressor flows toward the inlet of the high pressure compressor. When the valve 316c is fully closed, all of the compressed air produced by the low pressure compressor is further compressed by the high pressure compressor, thus elevating the charge air pressure beyond that normally produced by the low pressure stage. When the valve 316c is fully open, the compressed air exiting the low pressure compressor bypasses the high pressure compressor. In both cases, compressed charge air flows to and is accelerated by the supercharger 305. However, when the charge air is compressed by both compressors, it has a higher pressure (and therefore, a higher mass) than when it is compressed only by the low pressure compressor. Thus, it is the case that the charge air input to the supercharger has a higher mass, and the mass of charge air delivered for combustion (Mdelivered) is higher, when both compressors are on line. As a result, the supercharger does not have to be driven as hard to provide boost in response to as when fed by a single compressor. Consequently, pumping loss attributable to supercharger operation during high torque demand can be reduced.

Preferably, the bypass valves 316c and 316t are operated together by the ECU 740 (as are the bypass valves 330c and 330t) in order to smoothly respond to changes in torque demand. Given step-wise or continuously variable operation of the air-handling valves, the high-pressure turbocharger 314 can be progressively (and smoothly) transitioned into and out of operation. Thus, for low load, low engine speeds as would be encountered in a steady-state mode of operation, the ECU 740 keeps the bypass valves fully open, thereby bypassing the high pressure turbocharger 314 and allowing the low pressure turbocharger 312 alone to compress air for provision to the supercharger 305. When torque demand rises steeply enough that increasing engine speed and load cause a shift to a transient mode of engine operation, the ECU 740 causes the bypass valves to close, thereby eliciting a quick response by the high pressure turbocharger to the requirement for boost in (Mdelivered). During transient operation, the ECU 740 sets the bypass valves 316c and 316t (and/or the bypass valves 330c and 330t) as appropriate for the level of boost needed. Then, as the torque demand diminishes (as indicated by a reduction in engine speed and load) the ECU 740 progressively resets the bypass valves when engine speed/load causes a transition back to the steady-state mode of operation.

Here, the role of the charge air coolers may be more clearly understood. As compressed air is passed along the compressors and the supercharger in the charge air channel, its mass begins to decrease due to expansion caused by the increase in temperature that accompanies the increase in pressure. Passage through a charge air cooler reduces the temperature of the compressed air, thereby maintaining its mass.

As indicated by FIGS. 4-8, control of NOx may be maintained in the heavy-duty air handling embodiment of FIG. 3 by adapting the steady state and transient algorithms executed by the ECU 740 to include modulation of the recirculated exhaust in any one, or any combination of the high pressure, mid-pressure, and low pressure EGR loops by control of the EGR valve or valves.

Although this disclosure describes particular air handling embodiments for a heavy duty two-stroke cycle, uniflow-scavenged, opposed-piston engine, these embodiments are set forth merely as examples of underlying principles of this disclosure. Thus, the embodiments are not to be considered in any limiting sense.

The invention claimed is:

1. A two-stroke cycle, uniflow-scavenged, opposed-piston engine, comprising:
   one or more cylinders, each cylinder comprising a bore, longitudinally-separated exhaust and intake ports, and a pair of pistons disposed in the bore for opposing movements therein, in which movement of a first piston of the pair of pistons controls the exhaust port and movement of the second piston of the pair of pistons controls the intake port;
   a supercharger disposed in fluid communication with the intake ports to provide a continuous positive pressure differential from the intake ports to the exhaust ports so as to maintain a unidirectional flow of gas from the intake ports to the exhaust ports during two-stroke operation of the engine;
   a sequential turbocharger, including a first turbocharger and a second turbocharger, each of the turbochargers including a turbine and a compressor, in which the compressors of the first and second turbochargers are arranged in series with the supercharger such that the compressor of the first turbocharger is in fluid communication with the compressor of the second turbocharger and the compressor of the second turbocharger is in fluid communication with the supercharger, and the turbines of the first and second turbochargers are arranged in series with the exhaust ports such that the turbine of the second turbocharger is in fluid communication with the exhaust ports and the turbine of the first turbocharger is in fluid communication with the turbine of the second turbocharger;
   a compressor bypass valve associated with the second turbocharger and disposed in parallel with the compressor of the second turbocharger, the compressor bypass valve having a closed setting that causes pressurized air from the compressor of the first turbocharger to pass through the compressor of the second turbocharger and an open setting that directs pressurized air from the compressor of the first turbocharger past the compressor of the second turbocharger to an inlet of the supercharger; and,
   a turbine bypass valve associated with the second turbocharger and disposed in parallel with the turbine of the second turbocharger, the turbine bypass valve having a closed setting that causes exhaust gasses from the exhaust ports to pass through the turbine of the second turbocharger and an open setting that directs exhaust gasses from the exhaust ports past the turbine of the second turbocharger to the turbine of the first turbocharger.

2. The two-stroke cycle, uniflow-scavenged, opposed-piston engine of claim 1, in which the first turbocharger is a low pressure turbocharger and the second turbocharger is a high pressure turbocharger.

3. The two-stroke cycle, uniflow-scavenged, opposed-piston engine of claim 2, further comprising:
   a charge air channel including the series arrangement of the compressors of the first and second turbochargers and the supercharger which is operable to generate charge air for provision to the intake ports; and
   an EGR loop operable to circulate a portion of the exhaust gasses to the charge air channel.

4. The two-stroke cycle, uniflow-scavenged, opposed-piston engine of claim 3, the EGR loop comprising one or more of a low pressure EGR loop, a mid-pressure EGR loop, and a high-pressure EGR loop.

5. The two-stroke cycle, uniflow-scavenged, opposed-piston engine of claim 1, further comprising:
   a charge air channel including the series arrangement of the compressors of the first and second turbochargers and the supercharger which is operable to generate charge air for provision to the intake ports; and
   an EGR loop operable to circulate a portion of the exhaust gasses to the charge air channel.

6. The two-stroke cycle, uniflow-scavenged, opposed-piston engine of claim 5, the EGR loop comprising one or more of a low pressure EGR loop upstream of the sequential turbocharger, a mid-pressure EGR loop between the first and second turbochargers, and a high pressure EGR loop between the second turbocharger and the supercharger.

7. The two-stroke cycle, uniflow-scavenged, opposed-piston engine of claim 5, further comprising an exhaust channel including the series arrangement of the turbines of the first and second turbochargers and one or more after treatment devices downstream of the turbine of the first turbocharger.

8. The two-stroke cycle, uniflow-scavenged, opposed-piston engine of claim 1, further comprising:
   a recirculation channel coupling an outlet of the supercharger to an inlet of the supercharger; and,
   a supercharger recirculation valve in the recirculation channel.

9. The two-stroke cycle, uniflow-scavenged, opposed-piston engine of claim 8, in which the first turbocharger is a low pressure turbocharger and the second turbocharger is a high pressure turbocharger.

10. The two-stroke cycle, uniflow-scavenged, opposed-piston engine of claim 9, further comprising:
    a charge air channel including the series arrangement of the compressors of the first and second turbochargers and the supercharger, which is operable to generate charge air for provision to the intake ports; and
    an EGR loop operable to circulate a portion of the exhaust gasses to the charge air channel.

11. The two-stroke cycle, uniflow-scavenged, opposed-piston engine of claim 10, the EGR loop comprising one or more of a low pressure EGR loop, a mid-pressure EGR loop, and a high-pressure EGR loop.

12. The two-stroke cycle, uniflow-scavenged, opposed-piston engine of claim 8, further comprising a programmed engine control unit (ECU) coupled to control settings of the compressor bypass valve, the turbine bypass valve, and the supercharger recirculation valve in response to engine speed and intake port pressure.

13. The two-stroke cycle, uniflow-scavenged, opposed-piston engine of claim 12, in which the first turbocharger is a low pressure turbocharger and the second turbocharger is a high pressure turbocharger.

14. The two-stroke cycle, uniflow-scavenged, opposed-piston engine of claim 13, further comprising:

a charge air channel including the series arrangement of the compressors of the first and second turbochargers and the supercharger which is operable to generate charge air for provision to the intake ports; and an EGR loop operable to circulate a portion of the exhaust gasses to the charge air channel.

15. The two-stroke cycle, uniflow-scavenged, opposed-piston engine of claim 14, the EGR loop comprising one or more of a low pressure EGR loop, a mid-pressure EGR loop, and a high-pressure EGR loop.

16. The two-stroke cycle, uniflow-scavenged, opposed-piston engine of claim 1, further comprising an exhaust channel including the series arrangement of the turbines of the first and second turbochargers and one or more after treatment devices downstream of the turbine of the first turbocharger.

17. The two-stroke cycle, uniflow-scavenged, opposed-piston engine of claim 1, further comprising:
   a compressor bypass valve associated with the first turbocharger and disposed in parallel with the compressor of the first turbocharger, the compressor bypass valve having a closed setting that causes unpressurized fresh air from an air inlet to pass through the compressor of the first turbocharger and an open setting that directs the unpressurized fresh air past the compressor of the first turbocharger; and,
   a turbine bypass valve associated with the first turbocharger and disposed in parallel with the turbine of the first turbocharger, the turbine bypass valve having a closed setting that causes exhaust gasses to pass through the turbine of the second turbocharger and an open setting that directs exhaust gasses past the turbine of the first turbocharger.

18. The two-stroke cycle, uniflow-scavenged, opposed-piston engine of claim 17, further comprising:
   a charge air channel including the series arrangement of the compressors of the first and second turbochargers and the supercharger to generate charge air for provision to the intake ports;
   an exhaust channel including the series arrangement of the turbines of the first and second turbochargers to transport exhaust from the exhaust ports; and,
   an EGR loop having an inlet in the exhaust channel upstream of an inlet of the turbine of the second turbocharger and having an outlet in the charge air channel downstream of the compressor of the second turbocharger.

19. The two-stroke cycle, uniflow-scavenged, opposed-piston engine of claim 17, further comprising an exhaust channel including the series arrangement of the turbines of the first and second turbochargers and one or more after treatment devices downstream of the turbine of the first turbocharger.

20. The two-stroke cycle, uniflow-scavenged, opposed-piston engine of claim 8 or claim 16, further comprising an exhaust channel including the series arrangement of the turbines of the first and second turbochargers and one or more after treatment devices downstream of the turbine of the first turbocharger.

* * * * *